Figures 1, 2:
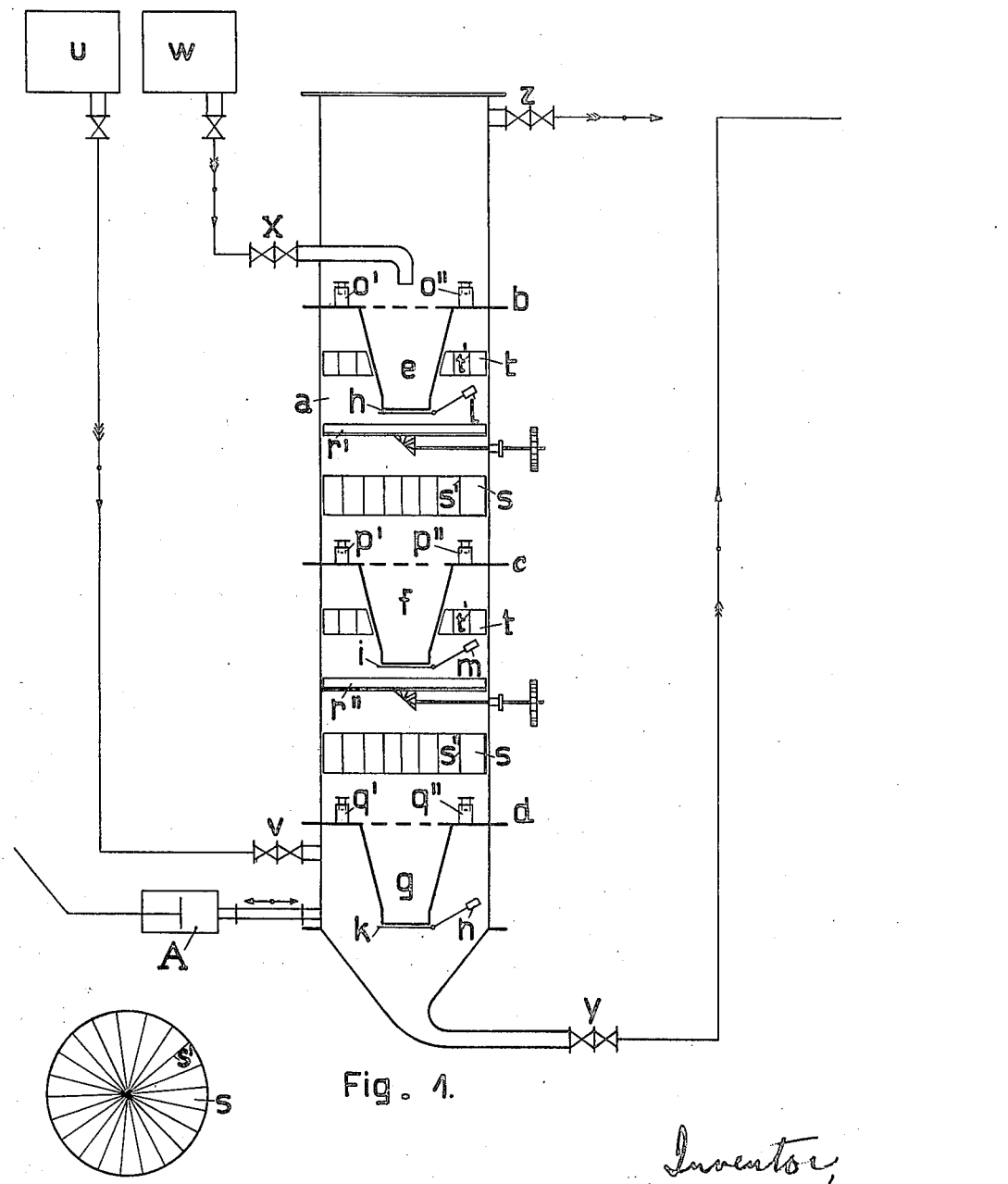

Patented Nov. 13, 1923.

1,474,062

UNITED STATES PATENT OFFICE.

HERMANN BOLLMANN, OF HAMBURG, GERMANY.

COUNTERCURRENT APPARATUS.

Application filed March 23, 1922. Serial No. 546,074.

*To all whom it may concern:*

Be it known that I, HERMANN BOLLMANN, a citizen of Hamburg, Germany, residing at Hamburg, Germany, have invented certain new and useful Improvements in Countercurrent Apparatus, of which the following is a specification.

The present invention relates to improvements in counter-current apparatus for technical and chemical purposes, particularly for decolouring fats and oils by means of bleaching earth as well as for extracting fine dust-like substances.

Apparatus already known for these purposes in which filtering-cloths are used through which the liquid is passed, have the drawback, that the extremely fine bleaching earth and the substances to be extracted will very soon clog the said filtering cloths. Consequently a very great pressure must be applied in order to move the liquid forward. Great pressure however influences the filtering-cloths unfavourably and results in rapid wear and tear of the same.

In the apparatus forming the subject-matter of the invention filtering devices are therefore entirely dispensed with and replaced by settling vessels provided with bottom-flaps.

In the accompanying drawing I have diagrammatically illustrated an embodiment of the improved apparatus as an example.

Figure 1 is a sectional elevation of the apparatus; and Figure 2 is a detailed view showing a plan of one of the bodies arranged within the apparatus and adapted to prevent the formation of whirls.

Similar letters refer to like parts throughout the figures.

The tower or column $a$ is subdivided by horizontal partition-walls $b\ c\ d$ for example into three compartments, chambers or steps. From the said partition-walls are suspended the settling vessels $e$, $f$ and $g$ respectively, the bottom openings of which are closed by flaps $h\ i$ and $k$ provided each with a suitable counter-weight $l$, $m$ and $n$ which presses the flap against the said bottom opening. The separate compartments or chambers are in communication by valves $o'\ o''$, $p'\ p''$ and $q'\ q''$ respectively. These valves open when pressure exists below the plates on which they are respectively located, and close, of their own weight when sufficient liquid has passed upwardly to equalize the pressure above and below. They may be referred to as one-way valves, as they allow liquid to pass in one direction, but not in the reverse direction, (up in the drawing and not down). Under the flaps $h$ and $i$ there is arranged a rotary distributing dish $r'$ and $r''$ respectively having each slot in its bottom for the passage of the liquid which drops down through fixed bodies $s$ underneath the said rotary slotted dishes. Each body being open at top and bottom, consists of a suitable frame $s$ for example of annular form (Fig. 2) and is traversed by a number of vertical radial plates $s'$. These spider-like bodies $s\ s'$ counteract the tendency to form whirls of the solid particles contained in the liquid. Similar anti-whirling devices $t\ t'$ which are annular are arranged above the rotating distributing dishes.

The unbleached oil or extracting means (solvent) is drawn from the supply-vessel $u$ and passes through the one-way valve $v$ into the apparatus $a$, whilst the bleaching earth-oil mixture or the fine substances to be extracted and some solution enter from the supply-vessel $w$ into the apparatus $a$ through the one-way valve $x$. The discharge of the used or worn-out bleaching earth-oil mixture or of the extracted substances takes place through the one-way valve $y$, and the discharge of the bleached oil or the enriched extracting means through the one-way valve $z$. The apparatus is operated by means of the suction and pressure pump A, and its use or application is as follows:

The tower $a$ is completely filled up with liquid. The supply-vessels $u$ and $w$ as well as the collecting vessels receiving the liquids and substances supplied through the valves $y$ and $z$ are on the same level somewhat above the level of the apparatus so that there is existing compensation of pressure.

At the sucking stroke of the pump A the valves $o'\ o''$, $p'\ p''$, $q'\ q''$, $y$ and $z$ close whereas the flaps and valves $h\ i\ k\ v$ and $x$ open. From the vessel $w$ discharges into the apparatus $a$ through the valve $x$ a certain adjustable amount of bleaching earth mixed with some oil, or of substances to be extracted with some extracting agent, and from the vessel $u$ through the valve $v$ a certain larger amount of unbleached oil or extracting agent. From and through the funnel-shaped settling vessels $e\ f\ g$ will pass bleaching earth mixed with oil or substances to be extracted together with some extracting agent or solvent onto the distributing dishes $r'$ and $r''$ wherefrom the said matters will slide downwardly through the bottom-slots of the said rotating dishes and the bodies $s\ s'$ thereunder. The cylinder of the pump fills with oil and bleaching earth-oil mixture or with solution and some of the substances to be extracted.

By the pressure stroke of the pump A the valves $h\ i\ k\ v$ and $x$ close, whilst the valves $o'\ o''$, $p'\ p''$, $q'\ q''$, $y$ and $z$ open. In the closed funnels $e\ f$ and $g$ is settling down the bleaching earth or the substance to be extracted. The contents of the pump cylinder A are forced back into the apparatus $a$. Through the valves $o'\ o''$, $p'\ p''$, $q'\ q''$ the bleached oil or enriched extracting agent (solvent) is forced upwards, after it has passed the bodies $t\ t'$. Through the valve $z$ discharges bleached oil or enriched extracting agent (solvent), through the valve $y$ the used or worn out bleaching earth-oil mixture or extracted substances.

The bleached oil will still contain a small quantity of solid particles which may be easily removed by means of a filtering press. Solid particles are also contained in the extracting agent or solvent which is enriched with the soluble matters contained in the fine dust-like substances, and may be further treated in well known manner.

I claim:

1. In an apparatus for treating fats and oils by means of bleaching earth and for extracting fine, dust-like substances, in a counter-current, the combination of a column or tower, partition-walls subdividing the said tower into several compartments, one-way valves in each of the said partition-walls to permit passing of the liquid in one direction stepwise through the said chambers, other one-way contrivances to permit the stepwise flow of the liquid and fine solid in the other direction, a supply-conduit and an outlet conduit, both connected to the lower end of the tower, another supply conduit and a second outlet conduit both connected to the upper end of the tower, suitable one-way valves in the four connecting conduits above mentioned and a suitable pumping device in connection with the lower part of the tower and adapted to act in cooperation with the said one-way valves and contrivances.

2. In an apparatus of the kind described, the combination of a tower, partition-walls subdividing it into several superimposed chambers, one-way valves in each of the partition-walls all allowing flow in one direction, settling vessels suspended from each of said partition-walls and each with a weighted bottom-flap allowing flow in the direction opposite to the flow allowed by said one-way valves, a supply-conduit for the liquid to be treated and an outlet conduit for the treated liquid, the former being connected to the lower portion and the latter to the upper portion of the tower, a supply-conduit for the active material and an outlet conduit for the worn out active material, the former connected to the upper portion and the latter to the lower portion of the tower, suitable one-way valves in the said four conduits, and a suitable pumping device in connection with the lower portion of the tower, adapted to act in cooperation with the said one-way valves and flaps.

3. In an apparatus of the kind described, the combination of a tower having several superimposed chambers in communication, in one direction by means of one-way valves, and in the opposite direction by means of settling vessels with bottom-flaps, a slotted rotary distributing dish below each settling vessel, supply conduits and corresponding outlet conduits to the said tower, controlled by one-way valves, and a pumping device in connection with the lower end of the tower and adapted to cooperate with the said one-way valves and bottom-flaps in the manner described.

4. In an apparatus of the kind described the combination of a tower having several superimposed chambers in communication in one direction by means of one-way valves and in the opposite direction by means of settling vessels with bottom-flaps, a slotted rotary distributing dish below each settling vessel, anti-whirling devices below and above at least some of said distributing dishes, supply conduits and corresponding outlet conduits to the said tower, such conduits being controlled by one-way valves, and a pumping device connected with the lower part of the tower and adapted to cooperate with the said one-way valves and bottom-flaps in the manner described.

5. In an apparatus of the kind described the combination of a tower having several superimposed chambers in communication in one direction by means of one-way valves and in the opposite direction by means of settling vessels with bottom-flaps, a slotted rotary distributing dish below each settling vessel, anti-whirling devices below and above each distributing dish each anti-whirling device consisting of a stationary frame carrying a plurality of vertical guiding plates, supply conduits and corresponding outlet conduits connected to the said tower, all controlled by one-way valves, and a pumping device in connection with the lower part of the tower and adapted to cooperate with the said one-way valves and bottom-flaps in the manner described.

In testimony that I claim the foregoing as my invention, I have signed my name.

HERMANN BOLLMANN. [L. S.]